(12) United States Patent
Yang

(10) Patent No.: US 8,578,969 B1
(45) Date of Patent: Nov. 12, 2013

(54) NON-RETURN STRUCTURE OF WATER VALVE

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 13/645,043

(22) Filed: Oct. 4, 2012

(51) Int. Cl.
*F16K 15/14* (2006.01)

(52) U.S. Cl.
USPC ..................... 137/854; 137/512.15

(58) Field of Classification Search
USPC ............... 137/854, 843, 512, 512.15
See application file for complete search history.

(56) References Cited

U.S. PATENT DOCUMENTS 4,513,784 A * 4/1985 Farrand et al. ................ 137/854

* cited by examiner

*Primary Examiner* — Kevin Lee
*Assistant Examiner* — Macade Brown

(57) ABSTRACT

A non-return structure of water valve includes a valve body, two limiting elements, and two non-return elements. The valve body forms two inlets and two annular protrusions around the two inlets respectively. Each annular protrusion encloses a receiving room receiving one of the limiting elements. The limiting element defines a widened hole and a reduced hole, and a stepped portion is formed therebetween. The non-return element includes a blocking portion disposed in the widened hole and having an external diameter larger than the one of the reduced hole, and the blocking portion is resilient. Thereby, returning water is unable to separate the circumference of the blocking portion from the stepped portion to form gaps. Thus, the non-return structure of water valve is able to prevent water from flowing back.

4 Claims, 5 Drawing Sheets

NON-RETURN STRUCTURE OF WATER VALVE

BACKGROUND OF THE INVENTION

1. Field of the Invention

The present invention relates to a water valve, more specifically to a non-return structure of water valve.

2. Description of the Prior Art

A conventional non-return structure of water valve, as shown in patent TW 509300, is integrally formed rubber having an end with a circular inlet and an opposite end with an obliquely reduced outlet. Two semicircular anti-leaking rings are disposed around the circular inlet, and a stepped portion above the rings forms annular grooves. In addition, an enhancing element is provided. Thereby, water is prevented from flowing reversely.

However, water from a reverse direction still strikes against the circumference of the outlet, so the circumference of the outlet may be deformed so that the outlet is opened. Thus, water may flow reversely.

SUMMARY OF THE INVENTION

The main object of the present invention is to provide a non-return structure of water valve which is not broken down due to reverse water.

To achieve the above and other objects, a non-return structure of water valve includes a valve body, a limiting element, and a non-return element.

The valve body includes a first face and a second face and forms at least one inlet and an outlet. The inlet and the outlet penetrate through the first end and the second end respectively. The first face forms at least one annular protrusion around the inlet and extending away from the second face. The annular protrusion encloses a receiving room communicating with the inlet.

The limiting element is disposed in the receiving room and encloses a widened hole and a reduced hole. A stepped portion is formed between the widened hole and the reduced hole. The limiting element further includes a buckle portion.

The non-return element includes a blocking portion and a fixing portion. The blocking portion is disposed in the widened hole and has an external diameter larger than the internal diameter of the reduced hole. The fixing portion axially extends from a side of the blocking portion away from the second face and is embedded at the buckle portion.

More specifically, the blocking portion is resilient. When the blocking portion is struck by exterior water, a gap is formed between a circumference of the blocking portion and the stepped portion so that the widened hole communicates with the reduced hole. On the contrary, when the blocking portion is struck by reverse water, the circumference of the blocking portion abuts against the stepped portion so that the widened hole discommunicates with the reduced hole.

Thereby, no matter how large the reverse water pressure is, no gap may be formed between the circumference of the blocking portion and the stepped portion. Thus, the non-return structure of the present invention is able to prevent water from flowing reversely.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
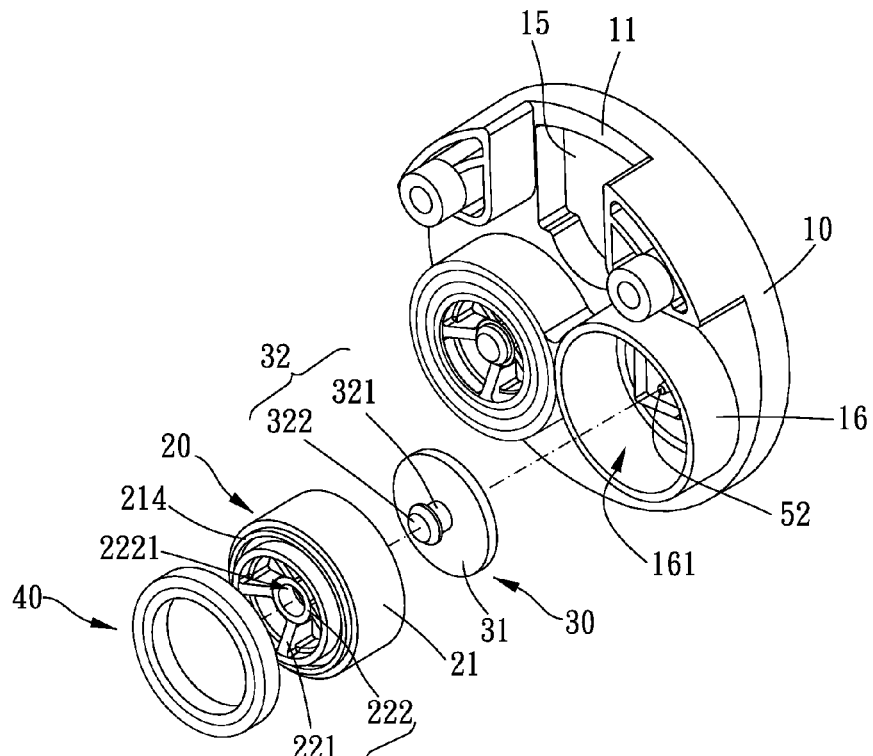
FIG. 1 is a breakdown drawing of the present invention.

Please refer to FIG. 1 to FIG. 3A. The non-return structure of water valve of the present invention includes a valve body 10, two limiting elements 20, two rings 40, and two anti-disassembling mechanisms.

The valve body 10 has a first face 11 and a second face 12. The valve body 10 forms at least one inlet, more preferably two inlets including a cold water inlet 13 and a hot water inlet 14. The valve body 10 further forms an outlet 15 adapted for allowing mixed water to flow through. The cold water inlet 13 and the hot water inlet 14 penetrate the first face 11, and the outlet 15 penetrates the second face 12. The valve body 10 forms at least one annular protrusion, more preferably two annular protrusions 16, from the first face 11. The two annular protrusions 16 are located around the cold water inlet 13 and the hot water inlet 14 respectively and extend away from the second face. In addition, each annular protrusion 16 defines a receiving room 161, and the two receiving rooms 161 communicate with the cold water inlet 13 and the hot water inlet 14 respectively.

The limiting elements 20 are disposed in the receiving rooms 161 respectively. Each limiting element 20 includes a hollow column 21 and a buckle portion 22. Each column 21 is disposed in one of the receiving rooms 161. More preferably, the column 21 has an external diameter substantially equal to an internal diameter of each annular protrusion 16 so that an outer surface of the column 21 touches an inner wall of one of the annular protrusion 16. Each column 21 encloses a widened hole 211 and a reduced hole 212, and a stepped portion 213 is formed between the widened hole 211 and the reduced hole 212. Besides, the reduced hole of one of the columns is connected with a cold water pipe (not shown in drawings), and the reduced hole of the other column is connected with a hot water pipe (not shown in drawings). A top of each column 21 forms an annular flange 214. Each buckle portion 22 includes a plurality of connecting ribs 221 and an annular rib 222 wherein the connecting ribs 221 connects the column 21 and the annular rib 222 therebetween. The connecting ribs 221 are arranged spacedly and define a plurality of hollow portions. The annular rib 222 has a receiving hole 2221.

Figure 4:
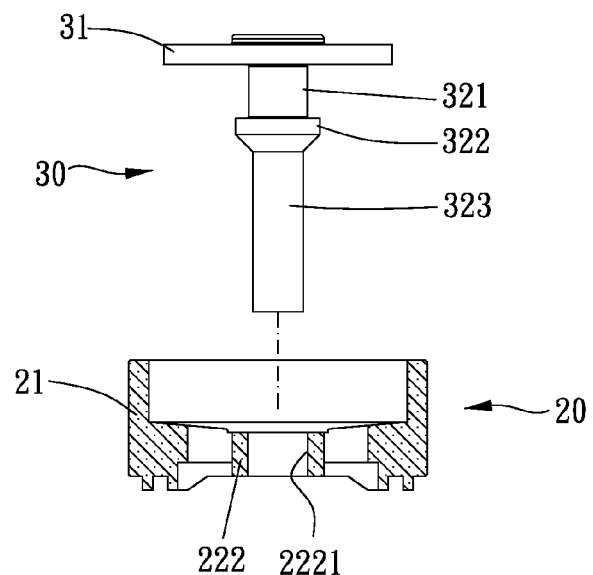
FIG. 4 is an illustration of a non-return element and a limiting element of the present invention before assembling.

Each of the two non-return elements 30 includes a blocking portion 31 and a fixing portion 32. The blocking portion 31 is disposed in the widened hole 211 of one of the columns 21, and the blocking portion 31 has an external diameter larger than an internal diameter of the reduced hole 212. More preferably, the blocking portion 31 is a circular resilient plate so that the blocking portion 31 is able to be deformed under pressure and to be restored without pressure. Each fixing portion 32 includes a neck portion 321, a head portion 322, and an auxiliary section 323 (as shown in FIG. 4). The neck portion 321 axially extends from a side of the blocking portion 31 away from the second face 12 into the reduced hole 212. In other words, an extending direction of the neck portion 321 is opposite to a flow direction of exterior water. On the contrary, the extending direction of the neck portion 321 is the same with a flow direction of returning water. On the other hand, the head portion 322 is located at end of the neck portion 321 away from the blocking portion 31 and is at an intermediate position of the blocking portion 31. More preferably, an end of the head portion 322 away from the neck portion 321 is tapered in a cone-shape, more specifically a circular cone-shaped. The auxiliary section 323 axially extends from the end of the head portion 322 away from the neck portion 321 and is substantially rod-shaped. Specifically, the auxiliary section 323 has an outer contour corresponding to the receiving hole 2221 of the annular rib 222. Besides, an end of each blocking portion 31 away from the fixing portion 32 has an abutting seat 311. More preferably, the abutting seat 311 is located at a center of the side of the blocking portion 31 away from the fixing portion 32 so that the abutting seat 311 corresponds to the neck portion 321 of the fixing portion 32.

Figures 5, 6:
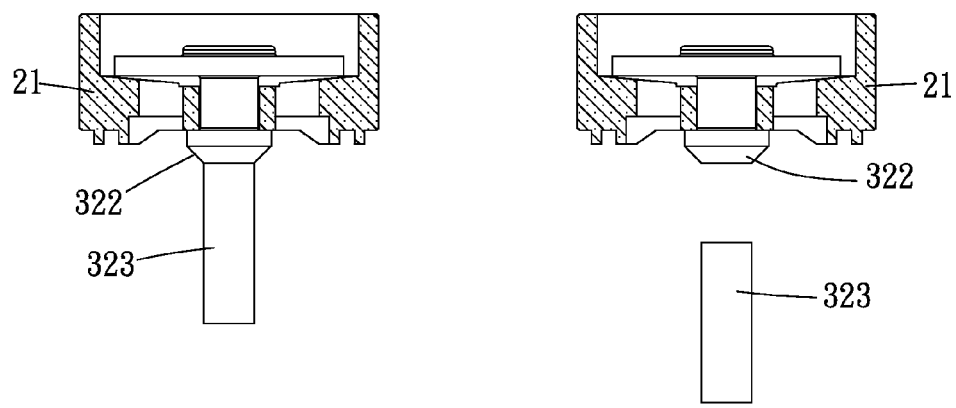
FIG. 5 is an illustration of a non-return element and a limiting element of the present invention after assembling.
FIG. 6 is an illustration of an auxiliary section being removed from a head portion.

Please refer to FIGS. 4 to 6 for assembling procedures of the non-return elements 30 and the limiting elements 20. First, the auxiliary section 323 is inserted through the receiving hole 2221. Thereafter, a user can hold the column 21 of the limiting element 20 with one hand and pull the auxiliary section 323 through the receiving hole 2221 with the other hand until the head portion 322 being disposed to the receiving hole 2221, as shown in FIG. 5. Thereafter, the auxiliary section 323 is removed from the head portion 322 by cutting with blades, as shown in FIG. 6. Generally speaking, the auxiliary section 323 is adapted for disposing the head portion 322 to the receiving hole 2221 when assembling the non-return element 30 and the limiting element 20.

A bottom of each ring 40 forms an annular groove 41. The annular flange 214 is disposed in the annular groove 41 so that each ring 40 is disposed on the top of the column 21 and is partially received in the receiving room 61. More preferably, an external diameter of the ring 40 is substantially equal to the internal diameter of the annular protrusion 16 so that an outer surface of the ring 40 abuts against the inner wall of the annular protrusion 16.

Each anti-disassembling mechanism includes a horizontal rib 51 and a vertical rib 52. The two horizontal ribs 51 traverse the cold water inlet 13 and the hot water inlet 14, and the vertical rib 52 axially extends from a side of the horizontal rib 51 away from the second face 12. In other words, an extending direction of the vertical rib 52 is opposite to the flow direction of exterior water. On the contrary, the extending direction of the vertical rib 52 is the same with the flow direction of returning water. Each vertical rib 52 abuts against the side of the blocking portion 31 away from the fixing portion 32 and corresponds to the fixing portion 32. More specifically, the vertical rib 52 abuts against the abutting seat 311.

Figure 2:
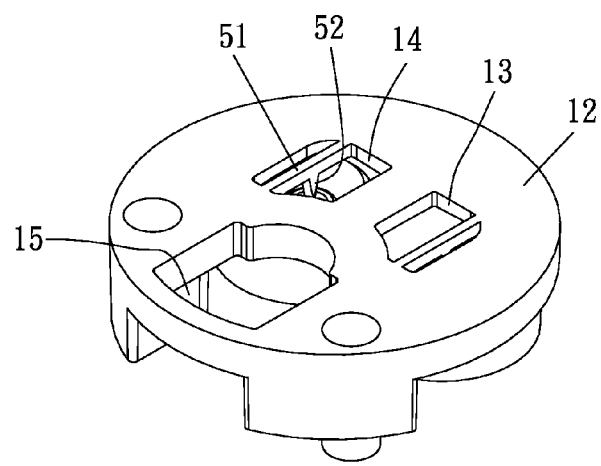
FIG. 2 is a stereogram showing of the present invention.
Figure 3:
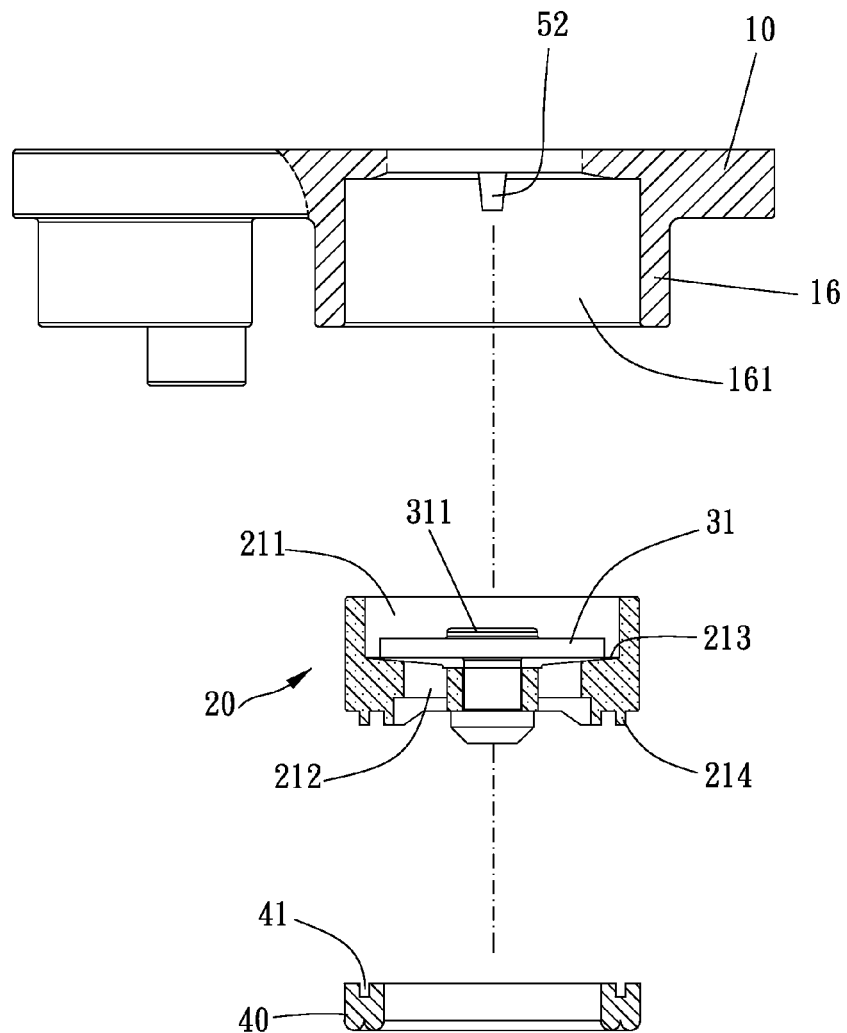
FIG. 3 is an illustration of the present invention.
Figure 3A:
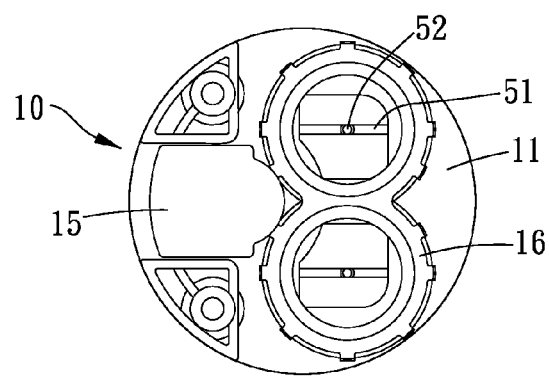
FIG. 3A is a partial enlargement of a valve body of the present invention.
Figure 7:
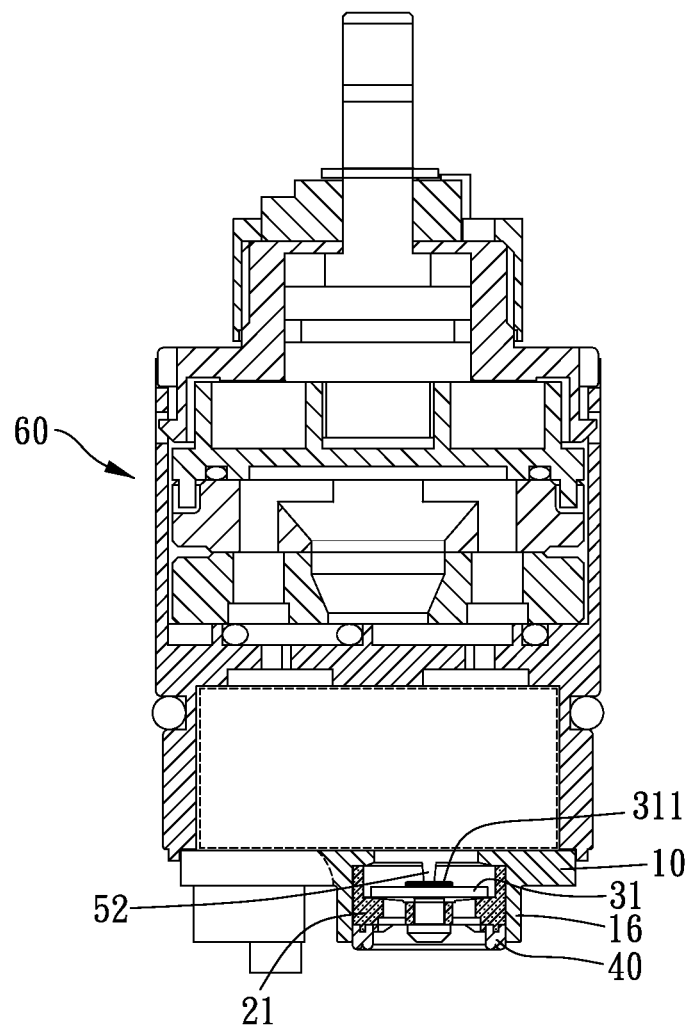
FIG. 7 is a cross-section drawing showing the present invention installed to a water valve.

Please refer to FIG. 7 in view of FIGS. 1 and 2. The present invention is adapted for being installed in a water valve 60 wherein the water valve 60 has a conventional structure. The water valve 60 is connected to two exterior water sources including cold water source and hot water source. When the water valve 60 is on, cold water and hot water pass through the non-return structure of the present invention and are mixed by other components of the water valve 60. The mixed water further flows through the outlet 15 of the valve body 10 for use.

Figure 8:
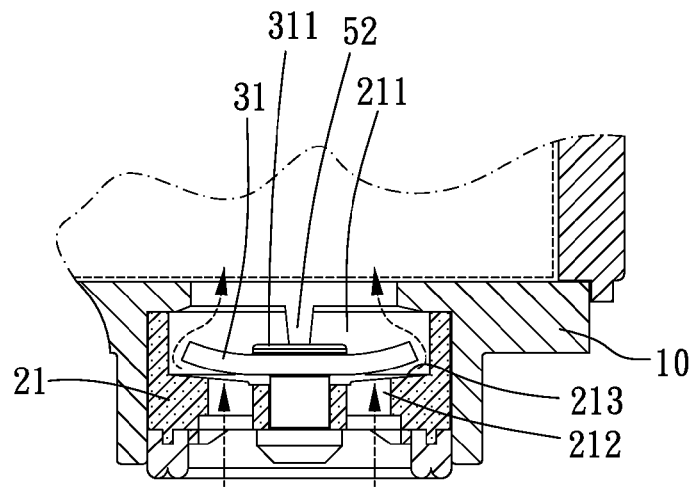
FIG. 8 is an illustration of a gap between a blocking portion of the non-return element and a stepped portion formed due to deforming of the blocking portion by exterior water.

Furthermore, please refer to FIG. 8 in view of FIGS. 1 and 2. When the cold water and the hot water enter the reduced holes 212 respectively, high-pressure water strikes and deforms the outer circumference of the blocking portion 31 so that the blocking portion 31 doesn't abut against the stepped portion 231. Thus, a gap is formed between the outer circumference of the blocking portion 31 and the stepped portion 213 so that the widened hole 211 and the reduced hole 212 communicate with each other. Thereby, cold water and hot water can enter the widened hole 211 via the gap and flow into the water valve through the cold water inlet 13 and the hot water inlet 14.

Figure 9:
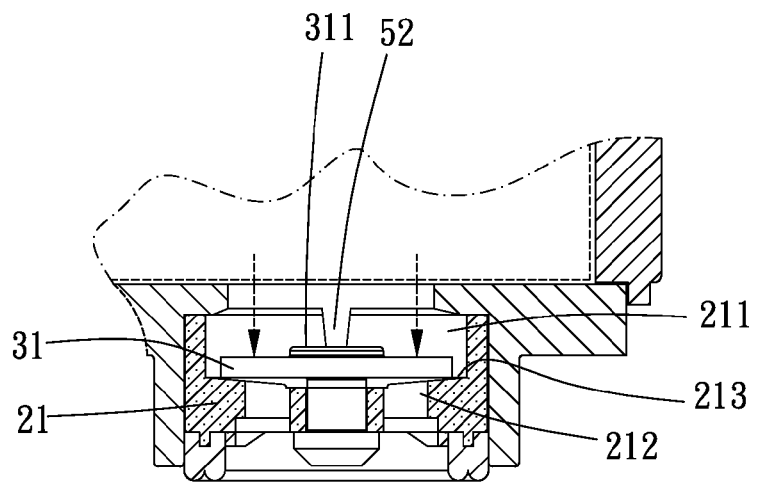
FIG. 9 is an operation illustration of the present invention.

When the water valve 60 is off, cold water and hot water don't enter the water valve 60 via the present invention, and part of unmixed cold water and hot water flows reversely to the present invention. Please refer to FIG. 9, water flowing reversely to the widened holes 211 has a water pressure to strike the outer circumference of the blocking portion 31 to restore the blocking portion 31 to an original shape. At the same time, the outer circumference of the blocking portion 31 abuts against the stepped portion 213 to discommunicate the widened hole 211 and the reduced hole 212. Thereby, water flowing reversely is unable to enter the reduced hole 212 due to the blocking portion 31.

Hence, no matter how high the reverse water pressure is, the outer circumference of the blocking portion 31 doesn't leave the stepped portion 213 to form gaps. Nevertheless, the outer circumference of the blocking portion 31 abuts against the stepped portion 213 more tightly when the reverse water pressure is higher.

Moreover, the fixing portions 32 of the two non-return elements 30 are disposed in the buckle portions 22, and the vertical ribs 52 abut against the two abutting seats 311 so that the two non-return elements 30 are positioned better. More preferably, better positioning effect is provided when the abutting seat 311 corresponds to the neck portion 321 of the fixing portion 32 and the vertical rib 52 corresponds to the neck portion 321 too. Thereby, the two non-return elements 30 are tightly positioned in the two limiting elements 20. No matter how high the water pressure is, the fixing portions 32 of the two non-return elements 30 won't be disassembled from the buckle portions 22 of the two limiting elements 20 when cold water and hot water enter the reduced holes 212.

What is claimed is:

1. A non-return structure of water valve, comprising:
a valve body, having a first face and a second face and forming at least one inlet and an outlet, the inlet and the outlet penetrating the first face and the second face respectively, the first face forming at least one annular protrusion around the inlet and extending away from the second face, the annular protrusion defining a receiving room enclosed thereby, the receiving room communicating with the inlet;
a limiting element, disposed in the receiving room and defining a widened hole and a reduced hole enclosed thereby, a stepped portion being formed between the widened hole and the reduced hole, the limiting element further having a buckle portion;
a non-return element, including a blocking portion and a fixing portion, the blocking portion being disposed in the widened hole and having an external diameter larger than an internal diameter of the reduced hole, the fixing portion axially extending from a side of the fixing portion away from the second face and being embedded in the buckle portion;
wherein the blocking portion is resilient, a gap is formed between an outer circumference of the blocking portion and the stepped portion to communicate the widened hole and the reduced hole when the blocking portion is struck by exterior water, the outer circumference of the blocking portion abuts against the stepped portion to discommunicate the widened hole and the reduced hole;

wherein the blocking portion is a circular resilient plate;

wherein the fixing portion has a head portion and a neck portion, an end of the head portion away from the neck portion is tapered, the neck portion is located at an intermediate portion of the blocking portion;

wherein the limiting element includes a hollow column, the column is disposed in the receiving room of the annular protrusion, the column has an external diameter substantially equal to an internal diameter of the annular protrusion;

wherein the buckle portion includes a plurality of connecting ribs and an annular rib, the connecting ribs connect the column and the annular rib therebetween, a plurality of hollow portions are formed between the connecting ribs, a receiving hole is formed through the annular rib to receive the head portion of the fixing portion;

wherein the fixing portion includes an auxiliary section extending axially from an end of the head portion away from the neck portion, the auxiliary section and the head portion are inserted through the receiving hole, thereafter the head portion is disposed at the receiving hole, and the auxiliary section is removed.

2. A non-return structure of water valve, comprising:

a valve body, having a first face and a second face and forming at least one inlet and an outlet, the inlet and the outlet penetrating the first face and the second face respectively, the first face forming at least one annular protrusion around the inlet and extending away from the second face, the annular protrusion defining a receiving room enclosed thereby, the receiving room communicating with the inlet;

a limiting element, disposed in the receiving room and defining a widened hole and a reduced hole enclosed thereby, a stepped portion being formed between the widened hole and the reduced hole, the limiting element further having a buckle portion;

a non-return element, including a blocking portion and a fixing portion, the blocking portion being disposed in the widened hole and having an external diameter larger than an internal diameter of the reduced hole, the fixing portion axially extending from a side of the fixing portion away from the second face and being embedded in the buckle portion;

wherein the blocking portion is resilient, a gap is formed between an outer circumference of the blocking portion and the stepped portion to communicate the widened hole and the reduced hole when the blocking portion is struck by exterior water, the outer circumference of the blocking portion abuts against the stepped portion to discommunicate the widened hole and the reduced hole;

wherein the blocking portion is a circular resilient plate;

wherein the fixing portion has a head portion and a neck portion, an end of the head portion away from the neck portion is tapered, the neck portion is located at an intermediate portion of the blocking portion;

wherein the limiting element includes a hollow column, the column is disposed in the receiving room of the annular protrusion, the column has an external diameter substantially equal to an internal diameter of the annular protrusion;

the non-return structure further including a ring, a top of the column forming an annular flange, a bottom of the ring forming an annular groove, the annular flange being disposed in the annular groove so that the ring is sleeved onto the top of the column and is partially in the receiving room.

3. A non-return structure of water valve, comprising:

a valve body, having a first face and a second face and forming at least one inlet and an outlet, the inlet and the outlet penetrating the first face and the second face respectively, the first face forming at least one annular protrusion around the inlet and extending away from the second face, the annular protrusion defining a receiving room enclosed thereby, the receiving room communicating with the inlet;

a limiting element, disposed in the receiving room and defining a widened hole and a reduced hole enclosed thereby, a stepped portion being formed between the widened hole and the reduced hole, the limiting element further having a buckle portion;

a non-return element, including a blocking portion and a fixing portion, the blocking portion being disposed in the widened hole and having an external diameter larger than an internal diameter of the reduced hole, the fixing portion axially extending from a side of the fixing portion away from the second face and being embedded in the buckle portion;

wherein the blocking portion is resilient, a gap is formed between an outer circumference of the blocking portion and the stepped portion to communicate the widened hole and the reduced hole when the blocking portion is struck by exterior water, the outer circumference of the blocking portion abuts against the stepped portion to discommunicate the widened hole and the reduced hole;

the non-return structure further including an anti-disassembling mechanism including a horizontal rib and a vertical rib, the horizontal rib traversing the inlet, the vertical rib extending axially from a face of the horizontal rib away from the second face of the valve body, the vertical rib abutting against a side of the blocking portion away from the fixing portion and corresponding to the fixing portion.

4. The non-return structure of water valve of claim 3, wherein the side of the blocking portion away from the fixing portion disposes with an abutting seat, the abutting seat corresponds to the fixing portion, the vertical rib abuts against the abutting seat.

* * * * *